(No Model.)
G. H. SPAULDING.
MOWER.
No. 364,315. Patented June 7, 1887.
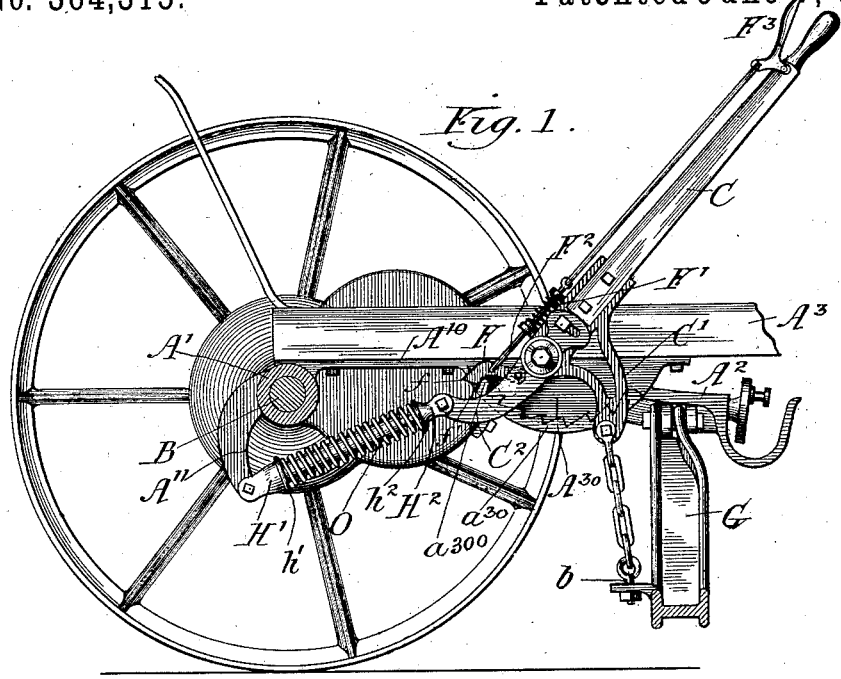
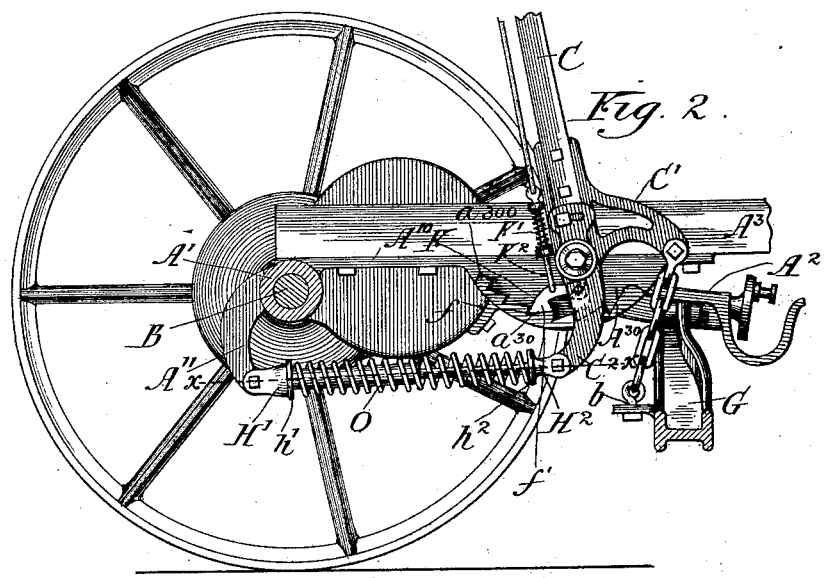
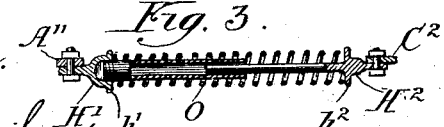
Witnesses:
Frank S. Blanchard
Arthur Johnson
Inventor:
George H. Spaulding
By Chas. S. Burton
Attorney.

UNITED STATES PATENT OFFICE.

GEORGE H. SPAULDING, OF CHICAGO, ILLINOIS, ASSIGNOR TO WILLIAM DEERING & COMPANY, OF SAME PLACE.

MOWER.

SPECIFICATION forming part of Letters Patent No. 364,315, dated June 7, 1887.

Application filed September 8, 1886. Serial No. 213,020. (No model.)

*To all whom it may concern:*

Be it known that I, GEORGE H. SPAULDING, a citizen of the United States, residing at Chicago, in the county of Cook and State of Illinois, have invented certain new and useful Improvements in Mowers, which are fully set forth in the following specification, reference being had to the accompanying drawings, forming a part thereof.

The purpose of this invention is to provide improved means for sustaining the cutter-mechanism frame and the cutter-bar and relieving the operator of their weight when he desires to lift the cutter-bar to pass obstructions; and it consists of a spring and mechanism connected therewith which reacts between the main frame and the lifting-lever.

Figure 1 is a sectional side elevation of a mower containing my invention, the position of the parts being with the cutter-bar down. Fig. 2 is a similar view with the cutter-bar raised. Fig. 3 is a section through $xx$ on Fig. 2.

The mower main frame is of the usual structure, and comprises the tubular portion $A'$, through which the axle B extends, and the forwardly-extended arm $A^2$, to which the cutter-mechanism frame G is pivoted, and the tongue $A^3$, which is made fast upon the sole $A^{10}$, and has fastened rigidly to it the bracket $A^{30}$. The bracket $A^{30}$ has pivoted to it the lifting-lever C, from which there is extended forwardly the lever-arm $C'$, to the forward end of which is connected the chain which is attached to the cutter-mechanism frame at $b$. Said lever C has also the lever-arm $C^2$ extended below its pivot. Upon the bracket $A^{30}$ is formed the notched flange, constituting a ratchet-rim, $a^{30}$, which is the arc of a circle about the pivot of the lever C, and to said lever is pivoted the dog F, having a nose adapted to engage the notches of said flange. There is provided a spring, $F'$, link $F^2$, and finger-lever $F^3$, to operate the dog F to cause it to be engaged with and disengaged from the notched flange. The tubular arm $A'$ is provided with the rearwardly-extended arm $A^{11}$. The end of the lever-arm $C^2$ and the end of the arm $A^{11}$ are connected by a telescoping link composed of the parts $H'$ and $H^2$, the former pivoted to the arm $A^{11}$ and the latter to the arm $C^2$. These parts are provided with shoulders $h'$ and $h^2$, respectively, near their pivotal connections with said arms respectively, and between said shoulders there is coiled about said telescoping link the spring O.

When the lever C is in the position shown in Fig. 1, and the cutter-bar is down, the pivot of the telescoping link to the arm $C^2$ is approximately in line with the pivot of said link to the arm $A^{11}$ and the pivot of the lever C. In this position, therefore, the spring can exert very little force tending to lift the cutter-mechanism frame. When it is desired to lift the frame, however, the dog F being disengaged from the notched flange $a^{30}$ by means of the link and lever $F^2$ and $F^3$, and the lever C rocked over its pivot toward the driver, the pivot of the telescoping link to the lever-arm $C^2$, passing below the line of the pivot of the lever C and of the pivot of the other end of the link, allows the spring O to exert its force to extend the link and force the lever-arm $C^2$ forward, carrying the arm $C'$ upward and lifting the cutter mechanism. In this action the spring gains leverage as it loses direct force, so that it exerts a nearly constant though somewhat increasing force to lift the cutter-mechanism frame until it reaches the position shown in Fig. 2, and in this position it is calculated to be strong enough to sustain the weight of the cutter-mechanism frame and mechanism thereon. It may, however, be locked at intermediate positions by means of the dog F engaging in the notched flange.

In order that movement over uneven ground may not cause the cutter-bar to "dance," as it might do, its weight being so nearly balanced by the spring, the dog F, while having a rearwardly-pointed nose adapted to engage the notches of the ratchet-rim, so as to lock the bar up at all intermediate points, is provided also with the hook-nose $f'$, whereby it engages the rear tooth, $a^{300}$, of the ratchet-rim, said tooth being made square in order to afford engagement for such hook-nose to lock the cutter-bar down to keep it to its work.

I claim—

1. In combination with the main frame of a mowing-machine, the cutter mechanism pivoted thereto, the lifting-lever pivoted on the main frame and connected to the cutter-mechanism frame, and a spring reacting between the lifting-lever and the main frame, the point at which the spring acts upon the lever being nearest to a line from the pivot of the lever to the point of support of the spring upon the frame when the cutter-mechanism frame is down, whereby the spring gains leverage as it loses reactionary force, substantially as and for the purpose set forth.

2. In combination with the main frame of a mowing-machine, the cutter-mechanism frame pivoted thereto, the lifting-lever pivoted on the main frame and having a forward-projected arm connected to the cutter-mechanism frame, and having the downwardly-projecting lever-arm $C^2$, the main frame being provided with a downwardly-projecting arm, as $A^{11}$, a telescoping link pivotally connected to the arms $C^2$ and $A^{11}$, and the spring coiled upon and tending to extend said link, the point at which the spring acts upon the lever being nearest to a line from the pivot of the lever to the point of support of the spring upon the downwardly-projecting arm of the frame when the cutting-mechanism frame is down, substantially as set forth.

3. In combintaion with the main frame of a mowing-machine, the cutter-mechanism frame pivoted thereto, the lifting-lever pivoted on the main frame and connected to the cutter-mechanism frame and having the lever-arm $C^2$, the main frame being provided with an arm, as $A^{11}$, a telescoping link connecting the arms $C^2$ and $A^{11}$, and the spring coiled upon and tending to extend said link, the pivot of said link to the arm $C^2$, when the cutter-bar is down, being approximately in line with the pivot of the lever and the other end of the link, substantially as set forth.

4. In combination with the main frame of a mowing-machine, the cutter-mechanism frame pivoted thereto, the lifting-lever pivoted on the main frame and connected to the cutter-mechanism frame, and having the lever-arm $C^2$ extended below its pivot, the main frame being provided with an arm, as $A^{11}$, extended below the axle, a telescoping link connecting the arms $C^2$ and $A^{11}$, and the spring coiled upon and tending to extend said link, the pivot of said link to the arm $C^2$, when the cutter-bar is down, being approximately in line with the pivot of the lever and the other end of the link, substantially as set forth.

5. In combination, substantially as set forth, the main frame arm $A^{11}$, the cutter-mechanism frame, the lifting-lever pivoted to the main frame, having the arm $C^2$, the spring reacting between said arms $C^2$ and $A^{11}$, the ratchet-rim $a^{30}$, and the dog F, pivoted to the lifting-lever and having the hook-nose $f'$, engaging the last tooth of the ratchet to prevent the cutter-mechanism frame from rising, and having the rearwardly-projecting nose $f$, engaging the remaining teeth, and to prevent said frame falling.

In testimony whereof I have hereunto set my hand, this 25th day of August, A. D. 1886, in the presence of two witnesses, at Chicago, Illinois.

GEO. H. SPAULDING.

Witnesses:
A. HART,
J. F. STEWARD.